May 15, 1928. 1,670,248
E. T. FERNGREN
SHEET GLASS DRAWING APPARATUS
Filed Oct. 31, 1925
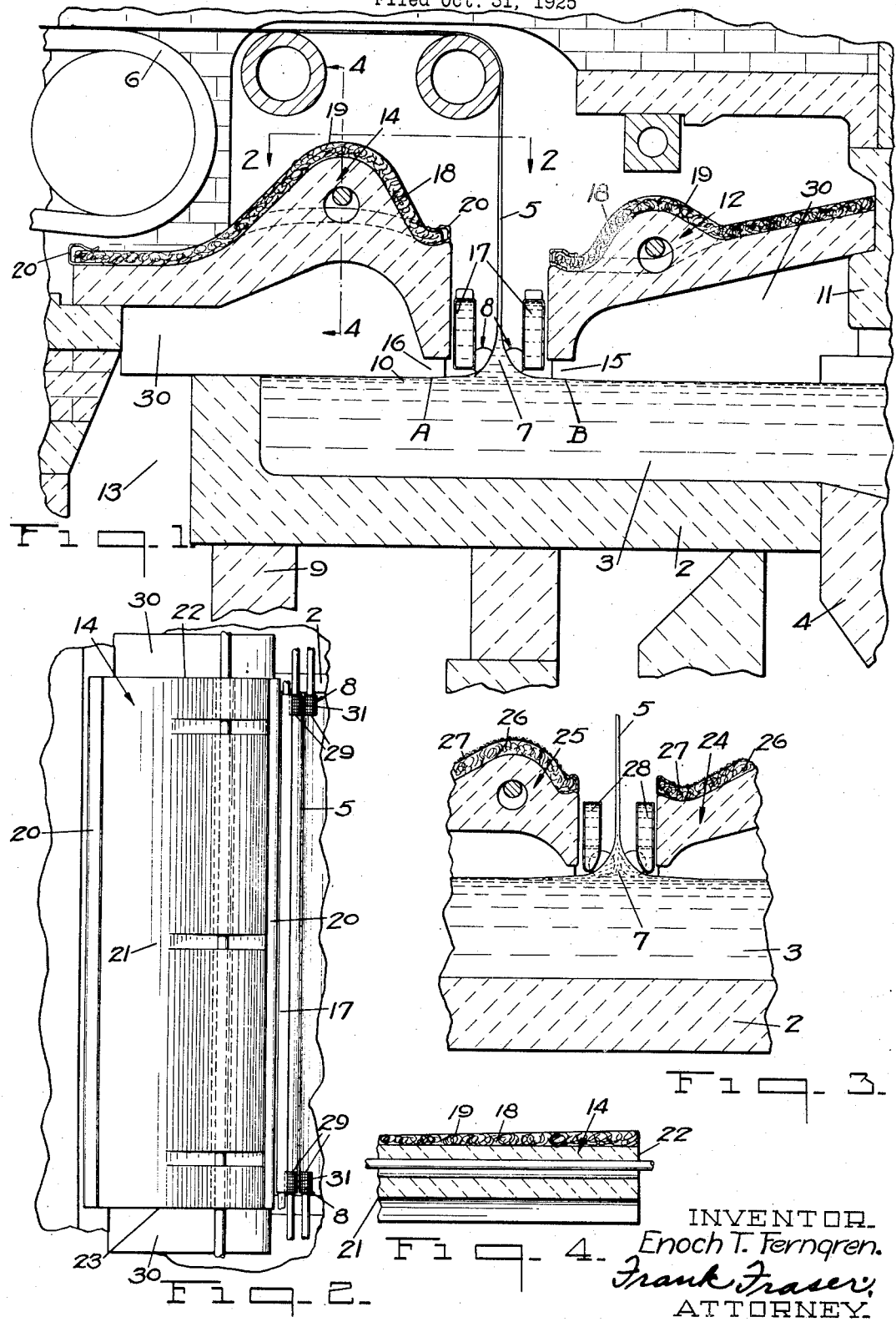
INVENTOR.
Enoch T. Ferngren.
Frank Fraser.
ATTORNEY.

Patented May 15, 1928.

1,670,248

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

Application filed October 31, 1925. Serial No. 65,998.

The present invention relates to sheet glass drawing apparatus, and has particular reference to improvements in cover or lip tiles.

An important object of the invention is to provide a cover tile or lip tile having means which will lower the conductivity thereof to a minimum.

Another object of the invention is to provide means whereby the surface glass beneath the lip tiles will remain in a more fluent or less viscous state for a greater length of time than heretofore before entering into the sheet.

A further object of the invention is to provide the lip tiles with means in such a manner that the conductivity characteristics thereof will be greater at their centers than at their edges.

Still another object of the invention is to provide a covering over a mass of molten glass which will permit conservation of fuel in heating said glass.

Other objects and advantages of the invention will become apparent during the course of the following description.

In the drawings wherein like numerals are employed to designate like parts throughout the same, Fig. 1 is a longitudinal sectional elevation of a sheet glass drawing apparatus showing the improved lip tiles, Fig. 2 is a plan view on line 2—2 in Fig. 1 showing one of the lip tiles, and Fig. 3 is a fragmental sectional elevation of a modified form of the lip tiles and coolers shown in Fig. 1, and Fig. 4 is a transverse vertical section taken on line 4—4 in Fig. 1.

The numeral 2 refers to a draw pot supplied with molten glass 3 from a glass melting furnace 4. A glass sheet 5 is continuously drawn by means of the drawing mechanism 6 from the meniscus 7 formed on the molten glass. The sheet 5 may be held to width by rotating knurled rolls 8 engaging the sheet edges.

The improved lip tiles covered by this invention are not necessarily limited to the sheet glass apparatus illustrated in the drawings, but may be used in connection with most any other form of glass drawing apparatus.

In order that the molten glass in the pot be kept at the desired and at substantially a uniform temperature, a fire box or heated chamber 9 surrounds the pot containing it.

In addition to the heating just mentioned, it is an object of the present invention to heat treat the upper surface layer 10 of molten glass in the pot sufficiently to retain it in a high state of fluidity for a greater period of time than heretofore, before being drawn away in sheet form. This heat treating is accomplished on one side of the sheet by causing the heat, permitted to escape from the furnace 4 between the jack arch 11 and the molten glass, to be deflected by the lip tile 12, upon the surface of that part of the molten glass thereunder. The heat treating of the upper surface layer on the other side of the sheet 5 is accomplished by permitting heat to escape from the fire box 9 through the passage 13 and then deflected by the lip tile 14 upon the surface of that part of the molten glass there under. The heat, after having treated the upper surface layer of the molten glass in the pot, is permitted to pass from beneath the lip tiles 12 and 14 at the points 15 and 16 respectively, and is then finally cooled by the relatively large coolers 17. The surface layer 10 of the molten glass will remain in a high state of fluidity for a longer period of time, also because less of it is exposed to a cooling atmosphere by reason of the fact that the lip tiles 12 and 14 are relatively nearer to each other. The openings at the ends of the lip tiles are closed by the refractory blocks 30.

The lip tiles 12 and 14, besides deflecting the heat escaping from the furnace and fire box, serve as reflectors for reflecting the heat radiated by the molten glass itself, and thus further aid in heat treating the upper surface glass.

The lip tiles 12 and 14 are made of suitable refractory material capable of withstanding high temperatures. The material ordinarily used is a fairly good conductor of heat. Therefore a considerable amount of heat is wasted which could be utilized in conditioning the molten glass in the draw pot. It is the purpose of this invention to prevent this loss of heat by covering the outer surface of the lip tiles with a suitable insulation 18, preferably rock or mineral wool.

The rock or mineral wool is quite light and flocculent and is of relatively low conductivity. To prevent this fluffy material from being accidentally removed by drafts, vibrations or jars, it is painted over with a solution of silicate of soda and lime, which, after drying, forms an outer crust 19 thereon. The blanket of insulation thus formed is sealed at the ends by the clamps 20 to further sustain it in a compact form upon the outer surface of the lip tiles.

As the molten glass in the draw pot under the lip tile loses its heat faster along the pot sides than in the center, it may be found that a balanced temperature condition can be had throughout by gradually increasing the thickness of the insulation from the lip tile centers 21 towards the ends 22 and 23 thereof, as shown in Fig. 4.

If a greater heat intensity is required to heat treat the surface layer of glass than can be attained by the main embodiment of the invention, the modification as illustrated in Fig. 3 may be resorted to. The lip tiles are placed nearer the glass level in the pot. This reduces the distance to be travelled by the deflected and radiated heat, and for this reason the heat will be of a higher temperature when striking the glass surface. The insulation 26 is compactly held upon the surface of the lip tile by a fine mesh screen 27. The coolers used in connection with this type of lip tiles are curved at the bottom to substantially conform to the curvature of the meniscus 7.

It is obvious that by satisfactorily trapping heat, from the fire box and the molten glass itself, a large portion of which has heretofore been wasted, and utilizing it to heat the upper surface glass in the draw pot, quite a saving in fuel will result.

By covering the greater part of the molten glass, as shown in Fig. 1, with the above described lip tiles, the upper surface thereof remains unset, until it reaches approximately the points A and B, where it becomes more plastic by reason of the cooling action created by the large coolers 17. It is substantially between these points A and B that the sheet 5 is initially formed. Owing to this relatively narrow chilled area at the base of the sheet, the stresses created in this area by the drawing force are comparatively reduced. The reduction of the stresses in this area may partially overcome the narrowing tendency action of the sheet at its base.

It is believed that by using substantially the same drawing force as heretofore and by confining the stressed surface layer of the glass over a relatively small area, the height and thickness of the meniscus 7 will be greatly reduced. This smaller meniscus 7 is desirable as less of it contacts with the front faces 29 of the edge rolls 8 engaging therewith. By reducing the surface contact of these roll faces with the meniscus may prove quite beneficial toward improving the condition of the sheet edges 31, particularly in regard to reducing the excessive thickness of that portion of the sheet edge adjacent the knurled edges.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, a lip tile, and means for insulating the lip tile.

2. In sheet glass drawing apparatus, a lip tile, insulating material covering the upper portion of the lip tile, and means for securing the insulation to said lip tile.

3. In sheet glass drawing apparatus, a plurality of lip tiles covering a mass of molten glass, insulating material covering the upper portion of the lip tiles, and means for sealing the insulation upon said lip tiles.

4. In sheet glass drawing apparatus, a plurality of lip tiles covering a mass of molten glass, insulating material covering the upper portion of each lip tile, and means for preventing the insulation from being accidentally removed.

5. In sheet glass drawing apparatus, a plurality of lip tiles covering a mass of molten glass, an insulating material covering the upper portion of the lip tiles, and a crust formed by a solution of silicate of soda and lime covering the outer surface of the insulation.

6. In sheet glass drawing apparatus, a plurality of lip tiles covering a mass of molten glass, an insulating material covering the upper portion of each lip tile, and a screen covering the outer surface of the insulation.

7. In sheet glass drawing apparatus, a plurality of lip tiles covering a mass of molten glass, and insulating material of unequal thickness covering the upper portion of the lip tiles.

8. In sheet glass drawing apparatus, a plurality of lip tiles covering a mass of molten glass, and an insulating material having a greater thickness at the outer edges of the lip tiles than at their centers, covering the upper portion thereof.

9. In a sheet glass drawing apparatus, comprising means for drawing a sheet of glass from a mass of molten glass, a pot containing the molten glass, means for supporting and heating the pot, a plurality of insulated lip tiles covering the largest possible area of molten glass in the pot, and cooling means within the uncovered glass area.

10. In sheet glass drawing apparatus, a plurality of lip tiles covering a mass of molten glass, insulating material covering the upper portion of each of the lip tiles, means for sealing the insulation upon said lip tiles, and means for supporting the lip tiles.

11. In sheet glass drawing apparatus, a plurality of lip tiles covering a mass of molten glass, insulating material covering the upper portion of each of the lip tiles, and a crust covering the outer surface of the insulation.

12. In sheet glass drawing apparatus, a plurality of lip tiles covering a mass of molten glass, insulating material covering the upper portion of each of the lip tiles, and a crust formed on the outer surface of the insulation.

13. In a sheet glass drawing apparatus, comprising means for drawing a sheet of glass from a mass of molten glass, a pot containing the molten glass, means for supporting and heating the pot, a plurality of lip tiles covering the molten glass, insulating material covering the lip tiles, said insulation increasing in thickness from the centers of the lip tiles towards the ends thereof.

Signed at Toledo, in the county of Lucas, and State of Ohio, this 28th day of October, 1925.

ENOCH T. FERNGREN.